Nov. 20, 1951 C. A. MARIEN ET AL 2,575,500

PISTON PACKING

Filed May 12, 1947

INVENTORS:
CHARLES A. MARIEN
FRANK D. FRISBY

BY *Harry A. Benner*

ATTORNEY.

Patented Nov. 20, 1951

2,575,500

UNITED STATES PATENT OFFICE 2,575,500

PISTON PACKING

Charles A. Marien, and Frank D. Frisby, St. Louis, Mo., assignors, by mesne assignments, to Ramsey Corporation, a corporation of Ohio Application May 12, 1947, Serial No. 747,524

1 Claim. (Cl. 309—47)

Our invention is related to improvements in piston packing rings and it consists in the novel features of construction more fully set forth in the specification and pointed out in the claim. The invention is specifically directed to the type of piston packing rings generally referred to in the art as oil rings for use in the lower piston ring grooves of the piston.

Figure 1:
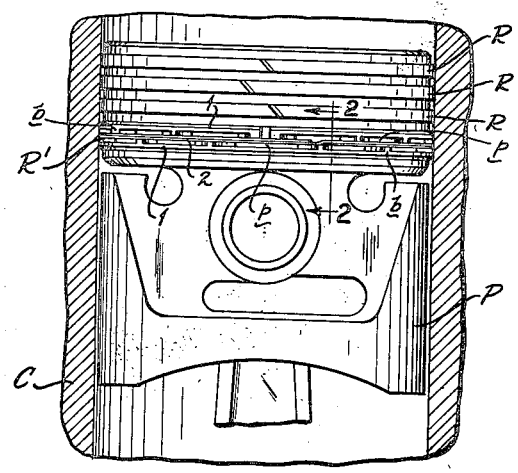
Figure 2:
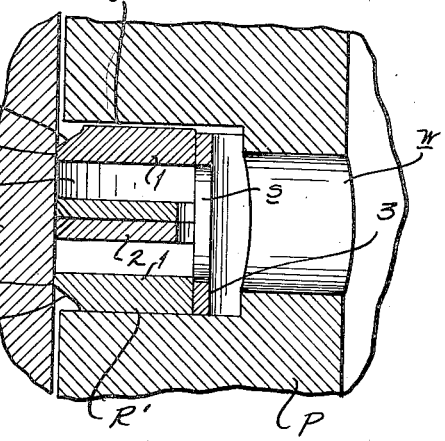
Figure 3:
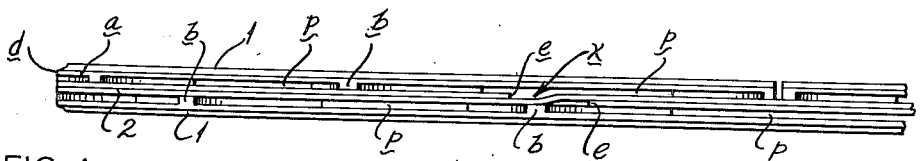
Figure 4:
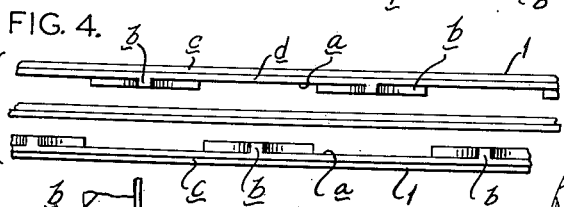
Figure 5:
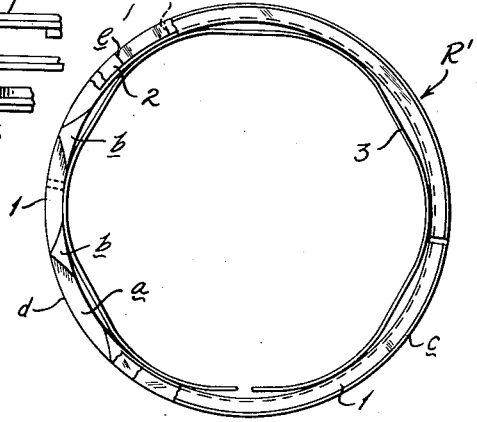
Figure 6:
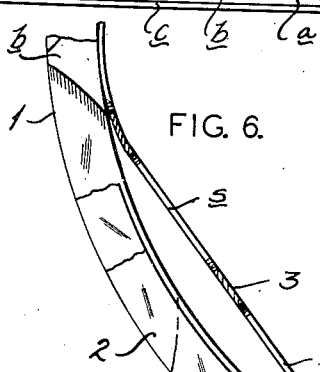
Figure 7:

The principal objects of the invention are: to provide an efficient oil ring that will have a minimum of total wall pressure; to provide a piston ring that will have free action within a piston ring groove, so as to always maintain contact with the cylinder wall; a piston comprising a multiple of components in close juxtaposition but exerting a minimum of friction between contacting components; a piston ring that is axially compressible wherein it may be fitted in the groove with a minimum of clearance; and one possessing other advantages that will be better apparent from a detailed description of the invention in connection with the accompanying drawings in which:

Fig. 1 is a fragmentary sectional view of the cylinder of an internal combustion engine showing a piston therein which is equipped with our improved piston ring; Fig. 2 is an enlarged vertical cross section taken through the lower groove of the piston on line 2—2 of Fig. 1 showing the piston ring deposited in said groove; Fig. 3 is a face view of our improved ring with a part thereof broken away; Fig. 4 shows sections of the ring components in their relative positions but spaced from each other for the sake of clarity; Fig. 5 is a top plan of our improved piston ring with parts of the top and middle components broken away; Fig. 6 is a fragmentary view on a large scale similar to Fig. 5; and Fig. 7 is an elevation of a fragment of the piston expander showing the oil drainage slots therein.

Referring to the drawings, C represents an engine cylinder within which is a standard piston P provided with the usual piston rings, R, R, R and our improved ring R'.

The ring R' is primarily for the purpose of controlling the oil flow over the cylinder wall and comprises outer components 1, 1 and inner component 2, said components being in closely contacting relation. The assembly of the three components is of such width that the entire ring will fit within the piston ring grooving g with a slight clearance. In the usual type of piston rings these clearances approximate .002″ on each side of the piston ring, however owing to the compressibility of the ring R' (as will appear later) these clearances may be somewhat less than the present practice. The outer ring components 1, 1 are of identical construction, each comprising an annular element a, and plurality of equally spaced bosses b projecting from one side face thereof. The edge opposite to the surfaces from which the bosses b project is tapered as shown at c so as to reduce considerably the width of the circumferential surface d which forms the cylinder contacting surface of the component 1.

The ring component 2 is in the form of a flat helical element of two turns and the ends e, e of the turns spaced to form a gap x to permit compression and expansion of the helical ring in action as is apparent in Fig. 3. The type of the helical ring herein used is not new per se as it has been used in other ring designs for some years. The disposing of a helical ring, such as component 2, between two ring components, such as 1, 1, is the essence of the present invention. Since the contact between the component 2 and the components 1, 1 is only at the bosses b, the friction between the contacting surfaces is greatly reduced from what it would be were the contact over the entire ring surface. This reduced friction enables the ring components to operate more nearly as individual rings instead of in unison.

It will be observed by referring to Figs. 3 and 4 that the bosses b of the one component 1 are staggered with relation to the bosses b of the other component 1 so that when lateral pressure is brought to bear against the ring assembly the resilience of the assembly will permit of slight compressibility. Obviously, this lateral compressibility of the ring assembly permits the ring to be fit into the ring groove with less clearance than is the case where the ring is non-compressible.

An expander or inner-ring 3 is disposed in the bottom of groove g behind the ring assembly R', but contacts only with the components 1, 1 as the axial thickness or depth of intermediate component 2 is slightly less than that of components 1, 1 as is clearly shown in Fig. 2. The advantage of this arrangement is that the expander 3 may augment the pressure of the components 1, 1 against the cylinder wall causing them to "wear-in" very quickly since they are preferably made of cast iron. The intermediate ring 2 being formed of a ribbon of spring steel and therefore having a comparatively high inherent tension does not require the increased pressure afforded by the expander 3 as its expanding action is sufficiently rapid to assure its hugging the cylinder wall at all times throughout the piston stroke.

When the components 1, 1 and 2 are assembled as shown in Figs. 2 and 3, oil drainage ports $p$ will be formed between adjacent bosses $b$ and ring component 2, and in order to permit a free passage of the oil through the rings into the bottom of groove $g$ the expander 3 is provided with a plurality of slots $s$ as shown in Fig. 7.

The bottom of the ring groove $g$ has drainage ports $w$ to permit the flow of excess oil from the groove $g$ into the cylinder and ultimately back to the crank-case as well understood.

From the foregoing it is apparent that the rapidly acting steel ring 2 floats between the cast iron ring components 1, 1 and operates substantially independently. Furthermore, the steel helical ring operates at all times in intimate contact with the cylinder wall since it cannot be unseated by hydro-static pressure, on account of the relief afforded by the spaces $p$ on each side thereof. Thus excess oil removed by the narrow scraper faces $d, d$ of the rings 1, 1 is immediately evacuated.

Having described our invention, we claim:

A piston packing comprising three rings in juxtaposition, the center ring consisting of a helically wound element having two cylinder contacting surfaces, and the outer rings being split and having cylinder contacting surfaces and bosses forming a part of the outer rings for maintaining said surfaces in spaced relation with the center ring.

CHARLES A. MARIEN.
FRANK D. FRISBY.

REFERENCES CITED

The following references are of record in the file of this patent:

UNITED STATES PATENTS

| Number | Name | Date |
| --- | --- | --- |
| 1,470,263 | Heslewood | Oct. 9, 1923 |
| 1,881,849 | Morton | Oct. 11, 1932 |
| 2,233,723 | Ballard | Mar. 4, 1941 |
| 2,240,624 | Marien | May 6, 1941 |
| 2,260,612 | Fall | Oct. 28, 1941 |

FOREIGN PATENTS

| Number | Country | Date |
| --- | --- | --- |
| 7,174 | Great Britain | May 15, 1868 |